Patented June 26, 1928.

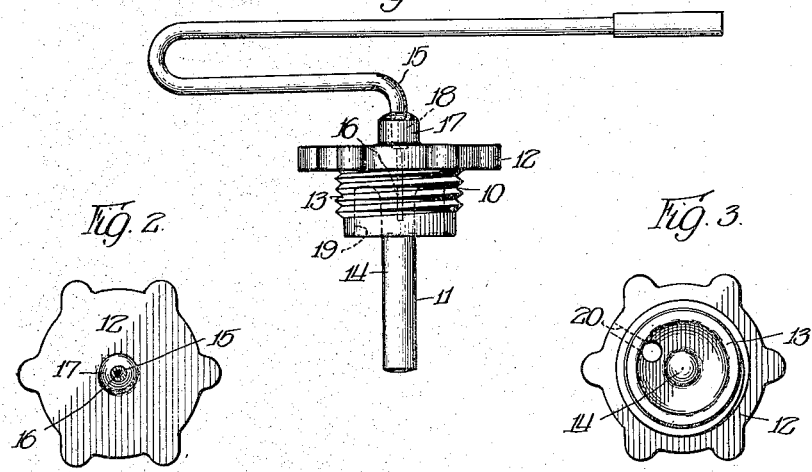
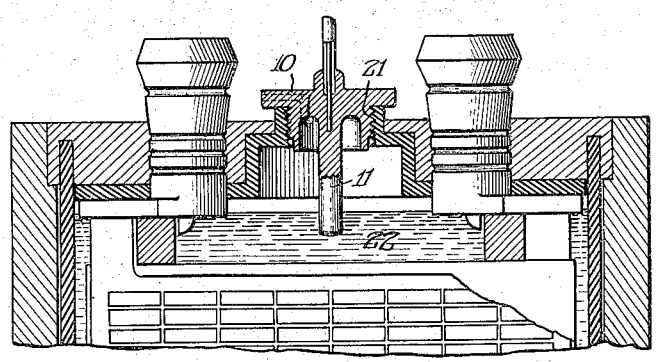
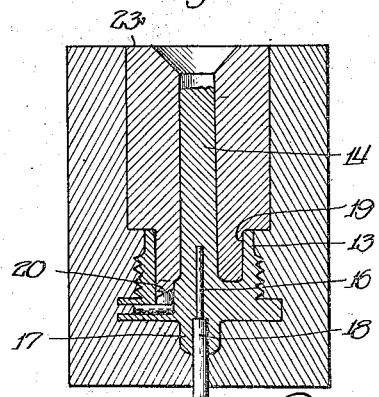

1,674,887

UNITED STATES PATENT OFFICE.

JAMES H. CHANNON, OF CHICAGO, ILLINOIS.

ELECTRODE CAP.

Application filed April 26, 1924. Serial No. 709,080.

The invention is concerned with an electrode cap, which is a device adapted to be positioned in the filling aperture of a storage battery for the purpose of transmitting current to an associated indicator as long as the electrolyte in the battery continues at the proper level in contact with the electrode portion of the device.

Attempts have been made to produce electrode caps by vulcanizing a hard rubber cap portion about the connection between a short lead rod and an insulated conducting wire. Attempts have also been made to produce electrode caps by axially aperturing the regular hard rubber cap, placing one end of a short lead rod in the bottom end of the aperture, placing one end of an insulated conducting wire in the top end of the aperture in contact with the rod, and vulcanizing the assembly about the rod and wire to obtain a rigid structure. Such electrode caps have not been satisfactory, however, since in each instance the insulation of the wire adjacent the vulcanized portion of the electrode cap is decomposed by the heat during the time required for vulcanizing and the acid with which the electrode cap comes in contact when in use attacks and rapidly cuts through the wire where the insulation is decomposed.

The principal object of the invention is to provide an electrode cap wherein the constituent portions are so associated as to withstand indefinitely the severe conditions incident to ordinary use.

Another important object of the invention is to provide a method of forming such an electrode cap whereby to achieve such an association of the constituent portions.

While the foregoing statments are indicative in a general way of the nature of the invention, other objects and advantages not specifically referred to in this disclosure will be obvious upon a full understanding of both the electrode cap and the method of forming the same as set forth in the following description and accompanying drawing, wherein is presented what is now considered to be a preferred embodiment of the invention. It will be understood however that this particular embodiment is chosen primarily for the purpose of exemplification and is not intended either to restrict in any way the spirit of the invention or to limit unnecessarily the scope of the appended claims.

In the drawing—

Fig. 1 is a side view of the electrode cap;

Fig. 2 is a top view of the same;

Fig. 3 is a bottom view of the same;

Fig. 4 is a sectional view through a storage battery equipped with the electrode cap; and Fig. 5 is a sectional view through a mold in which the electrode cap has been formed.

Referring in detail to the drawing, it will be observed that the electrode cap of the invention is saliently characterized by a construction wherein the cap portion 10 and the electrode portion 11 are integrally formed of a suitable electrode material, such as a lead alloy containing $94\frac{1}{2}$ percent lead, 5 percent antimony and $\frac{1}{2}$ percent tin for flux.

The structural features of the one-piece electrode cap include a flat top 12 having a suitably knurled periphery, an exteriorly screw-threaded sleeve 13 extending downwardly from the top 12, a cylindrical stud 14 also extending downwardly from the top 12 in concentric relation to the sleeve 13, an insulated conducting wire 15 extending upwardly from the top 12 with a bared end portion 16 of the wire embedded within the stud 14, a small boss 17 also extending upwardly from the top 12 about the insulated portion 18 of the wire 15 adjoining the bared end portion 16 of the same, an annular splash cup 19 between the sleeve 13 and the stud 14, and an angulated vent 20 leading upwardly from the splash cup 19 and opening laterally from the top 12. While the cap portion 10 of the electrode cap is shown in the present disclosure as having a screw-threaded surface for engagement in the screw-threaded filling aperture of a storage battery, it will be understood that such surface may be otherwise shaped to fit the securing means in the aperture of any battery.

The manner in which the electrode cap is used with a storage battery is clearly illustrated in Figure 4, wherein it will be observed that the cap portion 10 effectively closes the filling aperture 21 of the battery and the electrode portion 11 extends into the electrolyte 22 of the battery to a point corresponding to a low level of the same. The insulated conducting wire 15 of the electrode cap is adapted to be connected at a remote point to an indicator, such as the dash lamp of an automobile when the electrode cap is being used in association with the storage battery of an automobile. It will be understood that, as long as the electrolyte in the battery remains at a proper level and in contact with the electrode portion 11, current will flow from the electrode portion 11 through the wire 15, the lamp will be illuminated, or may be upon actuation of a suitable switch, and that, when the electrolyte falls below a proper level and out of contact with the electrode portion 11, the lamp will not be illuminated, which indicates that the battery is in need of water.

The method of forming the electrode cap consists in extending the wire 15 upwardly into the chamber of a sectional mold 23, shaped to correspond to the inverted electrode cap, to a position wherein the insulated portion 18 of the wire adjoining the end portion 16 is in that portion of the mold shaped to form the boss 17, and pouring the molten electrode material into the mold and about the bared and insulated portions of the wire exposed therein. The vent 20 is formed at the same time by suitably shaped projections in the mold. By molding the electrode cap in the manner described, as distinguished from die casting, the electrode cap solidifies almost instantly upon being poured and the heat from the limited amount of material forming the boss 17 about the insulated portion 18 of the wire is dissipated so rapidly that the insulation on the wire portion 18 is not destroyed.

The resulting electrode cap presents a structure which is entirely acid-proof, since the insulation on the conducting wire is not affected during the formation of the electrode cap and consequently encloses completely all portions of the wire at the junction between the same and the electrode cap. The electrode cap may be produced at a very low cost, since but one simple operation is required in its production.

I claim:

1. An electrode cap of the character described, including a cap portion and an electrode portion which are integrally formed of lead, and an insulated conducting wire having a bared end portion embedded in the formation.

2. An electrode cap of the character described, including a cap portion and an electrode portion which are integrally formed of lead, and an insulated conducting wire having a bared end portion embedded in the formation and an insulated adjoining portion in contact with the formation.

3. An electrode cap of the character described, including a cap portion and an electrode portion which are integrally formed of lead, and an insulated conducting wire having a bared end portion embedded in the formation and an insulated adjoining portion also embedded in the formation.

4. An electrode cap of the character described, including a cap portion and an electrode portion which are integrally formed of lead, and an insulated conducting wire having a bared end portion embedded in the formation, said cap portion having an upwardly projecting boss in which an insulated portion of the wire adjoining the bared end portion is embedded.

In testimony whereof I have hereunto subscribed my name.

JAMES H. CHANNON.